(12) United States Patent
Nara

(10) Patent No.: US 8,328,366 B2
(45) Date of Patent: Dec. 11, 2012

(54) PROJECTOR, COMPUTER PROGRAM PRODUCT, AND EXPOSURE ADJUSTING METHOD

(75) Inventor: Hiroshi Nara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 12/843,993

(22) Filed: Jul. 27, 2010

(65) Prior Publication Data

US 2011/0032381 A1  Feb. 10, 2011

(30) Foreign Application Priority Data

Aug. 7, 2009  (JP) .................................. 2009-184520

(51) Int. Cl.
G03B 21/14 (2006.01)
H04N 3/23 (2006.01)
H04N 7/12 (2006.01)
G06K 9/40 (2006.01)

(52) U.S. Cl. ......... 353/69; 353/70; 348/746; 348/396.1; 382/275

(58) Field of Classification Search .................... 353/70, 353/69, 121; 348/746, 396.1, 806; 382/275
See application file for complete search history.

(56) References Cited

U.S. PATENT DOCUMENTS

| 7,347,564 B2 | 3/2008 | Matsumoto et al. | |
| 2005/0007487 A1* | 1/2005 | Miyoshi et al. | 348/362 |
| 2005/0078879 A1* | 4/2005 | Sakurai et al. | 382/275 |
| 2010/0135595 A1* | 6/2010 | Du et al. | 382/275 |

FOREIGN PATENT DOCUMENTS

JP   2006-060447 A   3/2006

* cited by examiner

*Primary Examiner* — Georgia Y Epps
*Assistant Examiner* — Magda Cruz
(74) *Attorney, Agent, or Firm* — AdvantEdge Law Group, LLC

(57) ABSTRACT

A projector includes: a projecting unit that projects a first image on a projection target area; an imaging unit that picks up a first pickup image of the projection target area during the projection of the first image and picks up a second pickup image of the projection target area during single-color image projection or during non-projection with automatic exposure; an imaging control unit that changes an exposure setting value on the basis of the first pickup image and an exposure setting value during the last imaging and causes the imaging unit to pick up an image of the projection target area during the projection of the first image at the exposure setting value after the change and regenerate the first pickup image; a first coordinate information generating unit that generates first coordinate information; and a second coordinate information generating unit that generates second coordinate information.

5 Claims, 6 Drawing Sheets

PROJECTOR, COMPUTER PROGRAM PRODUCT, AND EXPOSURE ADJUSTING METHOD

CROSS-REFERENCE

The present application claims priority from Japanese Patent Application No. 2009-184520 filed on Aug. 7, 2009, which is hereby incorporated by reference in its entirety.

BACKGROUND

A projector is proposed that corrects distortion of an image using a pickup image (also referred to as trapezoidal distortion correction, trapezoid correction, keystone correction, etc.). For the projector to appropriately correct the distortion of the image, exposure during imaging needs to be appropriately set. For example, Japanese Patent Publication No. 2006-60447 describes that an image of a totally white pattern (an image that is entirely white), an image of a black and white checker pattern, and an image of a totally black pattern (an image that is entirely black) are picked up with fixed exposure to detect frames of the images and frames of a screen and an image of the totally black pattern is picked up with automatic exposure to complementarily detect the frames of the screen in the pickup image.

However, in Japanese Patent Publication No. 2006-60447, it is unclear with what kind of exposure the images are picked up when the images are picked up with the fixed exposure. For example, when exposure setting is too high, a white void occurs in a pickup image and, when exposure setting is too low, contrast of a pickup image falls and it is difficult to appropriately detect a boundary line or the like included in the pickup image.

SUMMARY

Various embodiments may provide a projector, a computer program product, and an exposure adjusting method that can generate more accurate coordinate information by appropriately adjusting exposure.

According to at least one embodiment of the disclosure, there is provided a projector including: a projecting unit that projects a first image including an image showing at least one segment on a projection target area; an imaging unit that picks up an image of the projection target area during the projection of the first image to generate a first pickup image and picks up an image of the projection target area during single-color image projection or during non-projection with automatic exposure to generate a second pickup image; an imaging control unit that changes, when a luminance value of a part of the segment included in the first pickup image is not within a predetermined range, an exposure setting value on the basis of the luminance value and an exposure setting value during the last imaging and causes the imaging unit to pick up an image of the projection target area during the projection of the first image at the exposure setting value after the change and regenerate the first pickup image; a first coordinate information generating unit that generates, on the basis of the first pickup image, first coordinate information indicating a coordinate of the part of the segment; and a second coordinate information generating unit that generates, on the basis of the second pickup image, second coordinate information indicating a coordinate of a boundary line of the projection target area.

According to at lest one embodiment of the disclosure, there is provided a computer program product embodied in at least one computer readable medium and comprising computer instructions executable by a computer of a projector to perform the function of: causing a projecting unit to project a first image including an image showing at least one segment on a projection target area; causing an imaging unit to pick up an image of the projection target area during the projection of the first image to generate a first pickup image; determining whether a luminance value of a part of the segment included in the first pickup image is within a predetermined range; changing, when the luminance value is not within the predetermined range, an exposure setting value on the basis of the luminance value and an exposure setting value during the last imaging and causing the imaging unit to pick up an image of the projection target area during the projection of the first image at the exposure setting value after the change to regenerate the first pickup image; generating, on the basis of the first pickup image, first coordinate information indicating a coordinate of the part of the segment; causing the imaging unit to pick up an image of the projection target area during single-color image projection or during non-projection with automatic exposure to generate a second pickup image; and generating, on the basis of the second pickup image, second coordinate information indicating a coordinate of a boundary line of the projection target area.

According to at least one embodiment of the disclosure, there is provide an exposure adjusting method including: a computer of a projector, causing a projecting unit to project a first image including an image showing at least one segment on a projection target area; causing an imaging unit to pick up an image of the projection target area during the projection of the first image to generate a first pickup image; determining whether a luminance value of a part of the segment included in the first pickup image is within a predetermined range; changing, when the luminance value is not within the predetermined range, an exposure setting value on the basis of the luminance value and an exposure setting value during the last imaging and causing the imaging unit to pick up an image of the projection target area during the projection of the first image at the exposure setting value after the change to regenerate the first pickup image; generating, on the basis of the first pickup image, first coordinate information indicating a coordinate of the part of the segment; causing the imaging unit to pick up an image of the projection target area during single-color image projection or during non-projection with automatic exposure to generate a second pickup image; and generating, on the basis of the second pickup image, second coordinate information indicating a coordinate of a boundary line of the projection target area.

According to the embodiments, the projector can generate more accurate coordinate information by picking up, in detecting a coordinate of a segment in an image, the image with exposure based on a luminance value and an exposure setting value during the last imaging and picking up, in detecting a coordinate of a boundary line of a projection target area, the image with automatic exposure.

The projector may include a determining unit that determines, on the basis of the first coordinate information, whether trapezoidal distortion correction is possible.

Consequently, since the projector can more accurately generate the first coordinate information, the projector can more appropriately determine whether the trapezoidal distortion correction is possible.

The projector may include a trapezoidal distortion correction unit that performs, when the determining unit determines that the trapezoidal distortion correction is possible, the trapezoidal distortion correction on the basis of the first coordinate information and the second coordinate information.

Consequently, since the projector can more accurately generate the first and second coordinate information, the projector can more accurately perform the trapezoidal distortion correction.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Embodiments in which the invention is applied to a projector are explained below with reference to the accompanying drawings. The embodiments explained below by no means limit the content of the invention described in claims. All components described in the embodiments are not always essential as solving means of the invention described in claims.

First Embodiment

Figure 1A:
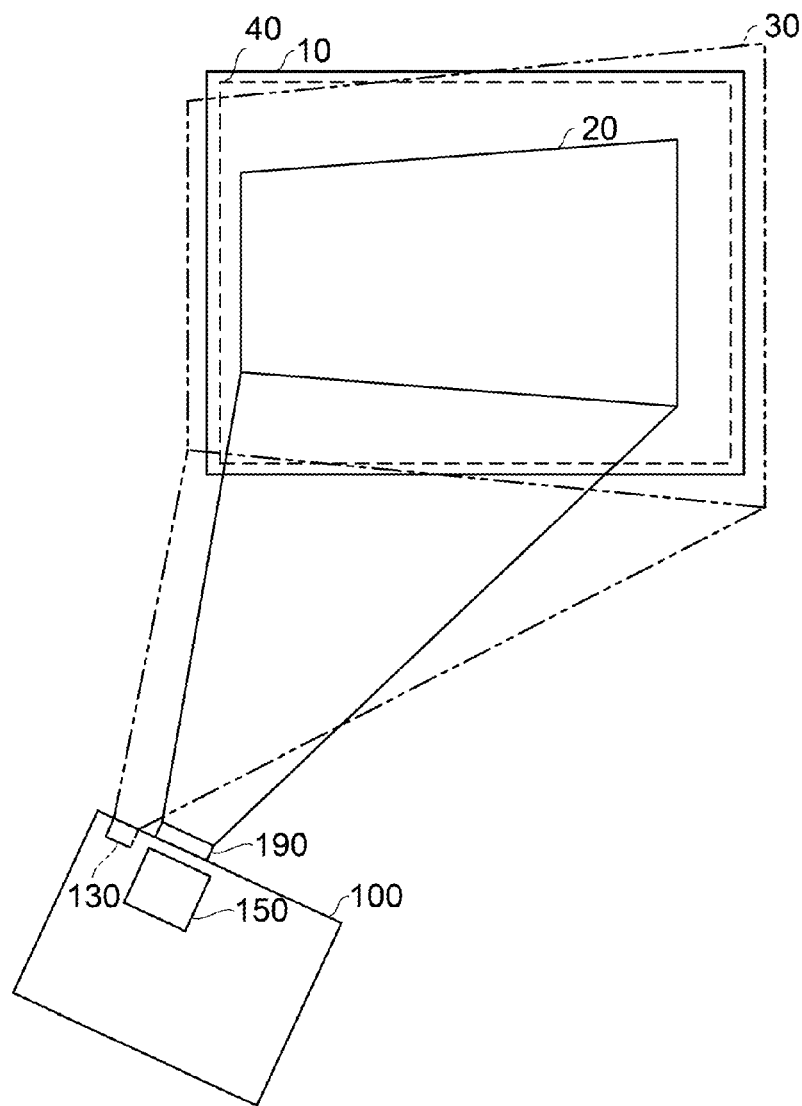
FIG. 1A is a diagram of an image projection state in a first embodiment.
Figure 1B:
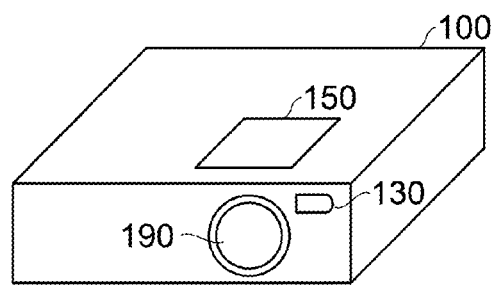
FIG. 1B is a perspective view of a projector in the first embodiment.

FIG. 1A is a diagram of an image projection state in a first embodiment. FIG. 1B is a perspective view of a projector in the first embodiment. A projector 100 has a function of projecting an image 20 on a screen 10, which has a projection target area 40, and picking up, using an imaging unit 130, an image of an imaging range 30 including the image 20 projected on the screen 10.

When a user sets the projector 100 of a portable type, the user performs automatic trapezoidal distortion correction by pressing a predetermined button provided in an operation unit 150 of a main body of the projector 100 or a predetermined button provided in a remote controller for giving an instruction to the projector 100.

In performing the automatic trapezoidal distortion correction, the projector 100 projects an image including a pattern image, picks up the image, and determines whether trapezoidal distortion correction is possible. When the trapezoidal distortion correction is possible, the projector 100 projects a totally black image, picks up the image, and generates coordinate information of a boundary line of the screen 10. The projector 100 performs different kinds of exposure adjustment during the pickup of the image including the pattern image and during the pickup of the totally black image performed when the trapezoidal distortion correction is possible.

Figure 2:
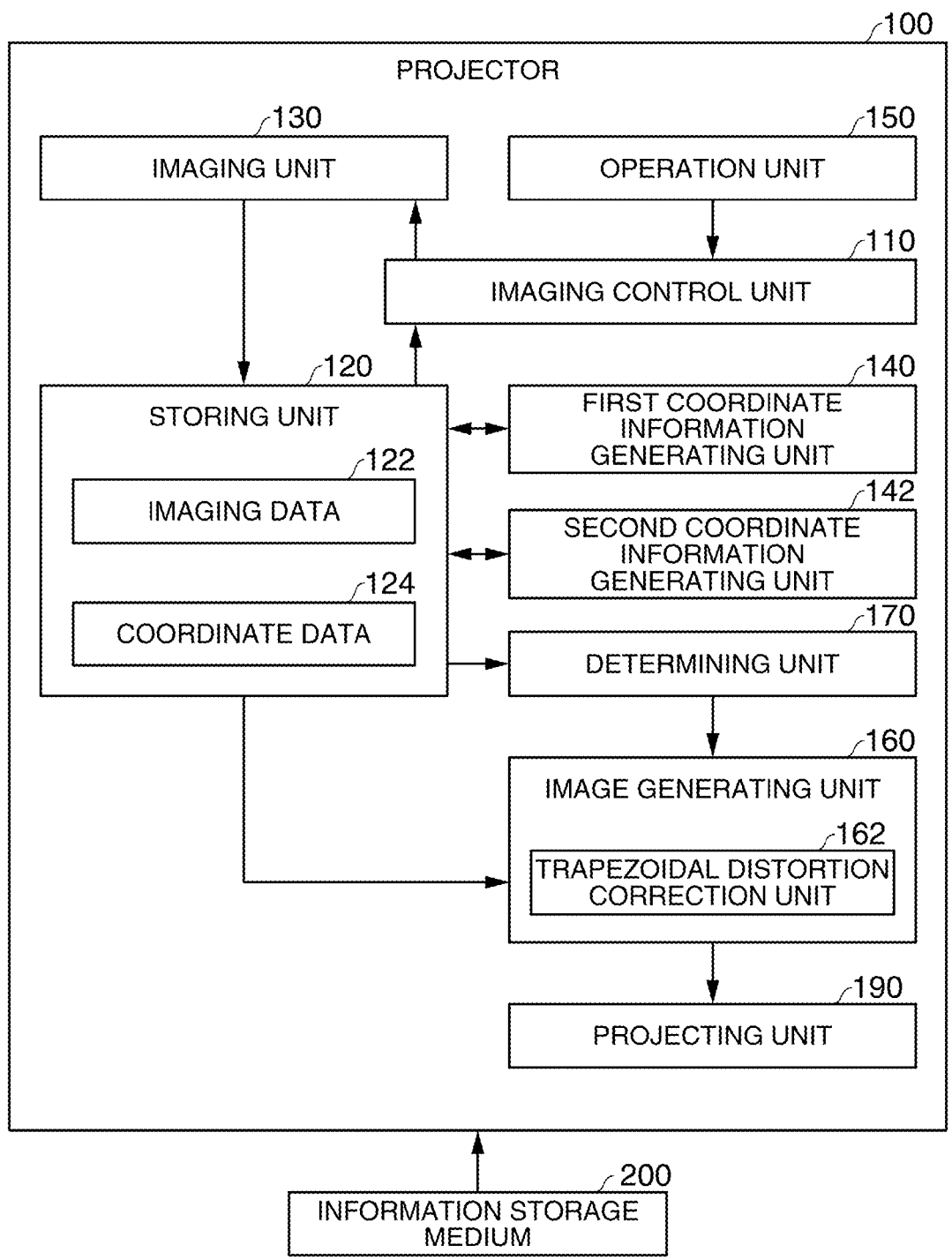
FIG. 2 is a functional block diagram of a projector in the first embodiment.

Functional blocks of the projector 100 having such functions are explained below. FIG. 2 is a functional block diagram of the projector 100 in the first embodiment. The projector 100 includes the imaging unit 130, an imaging control unit 110 that controls the imaging unit 130, a storing unit 120 that stores various data, a first coordinate information generating unit 140 that generates first coordinate information indicating a coordinate of a segment of a pattern image in a pickup image, a second coordinate information generating unit 142 that generates second coordinate information indicating a coordinate of a boundary line of the screen 10, the operation unit 150, an image generating unit 160 having a trapezoidal distortion correction unit 162, a determining unit 170, and a projecting unit 190.

The storing unit 120 has stored therein, for example, imaging data 122 indicating a pickup image generated by the imaging unit 130 and coordinate data 124 indicating the coordinate information generated by the first coordinate information generating unit 140 and the second coordinate information generating unit 142.

The projector 100 may function as these units using hardware explained below. For example, in the projector 100, a CPU or the like may be used as the imaging control unit 110, the first coordinate information generating unit 140, the second coordinate information generating unit 142, and the determining unit 170, a RAM or the like may be used as the storing unit 120, a CMOS camera or the like may be used as the imaging unit 130, a remote controller, buttons, or the like may be used as the operation unit 150, an image processing circuit or the like may be used as the image generating unit 160, and a lamp, a liquid crystal panel, a liquid crystal driving circuit, a projection lens, and the like may be used as the projecting unit 190.

A computer included in the projector 100 may read a computer program stored in an information storage medium 200 and function as the imaging control unit 110 or the like. As such an information storage medium 200, for example, a CD-ROM, a DVD-ROM, a ROM, a RAM, an HDD, or the like can be applied.

Figure 3:
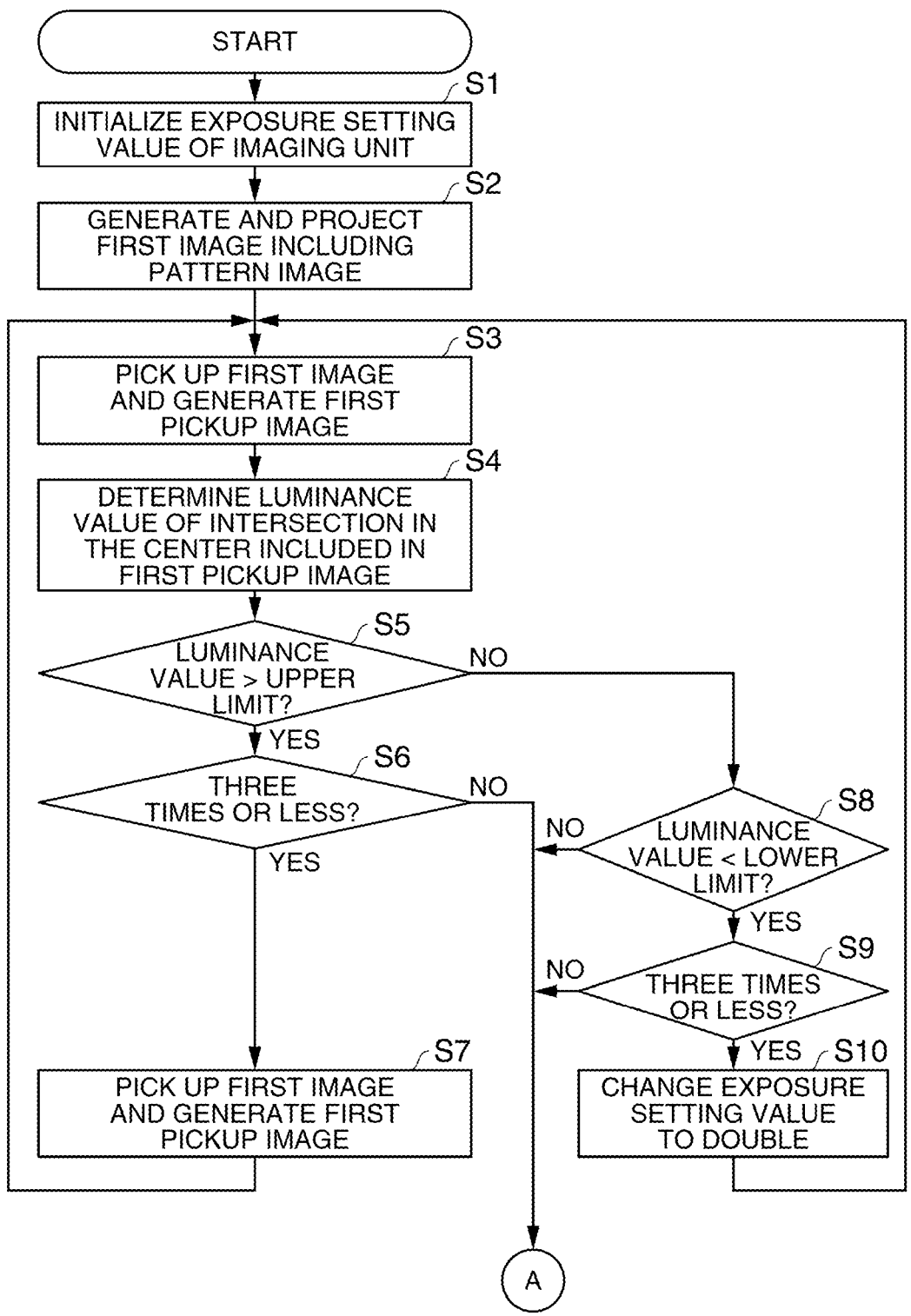
FIG. 3 is a first flowchart for explaining an exposure adjustment procedure in the first embodiment.
Figure 4:
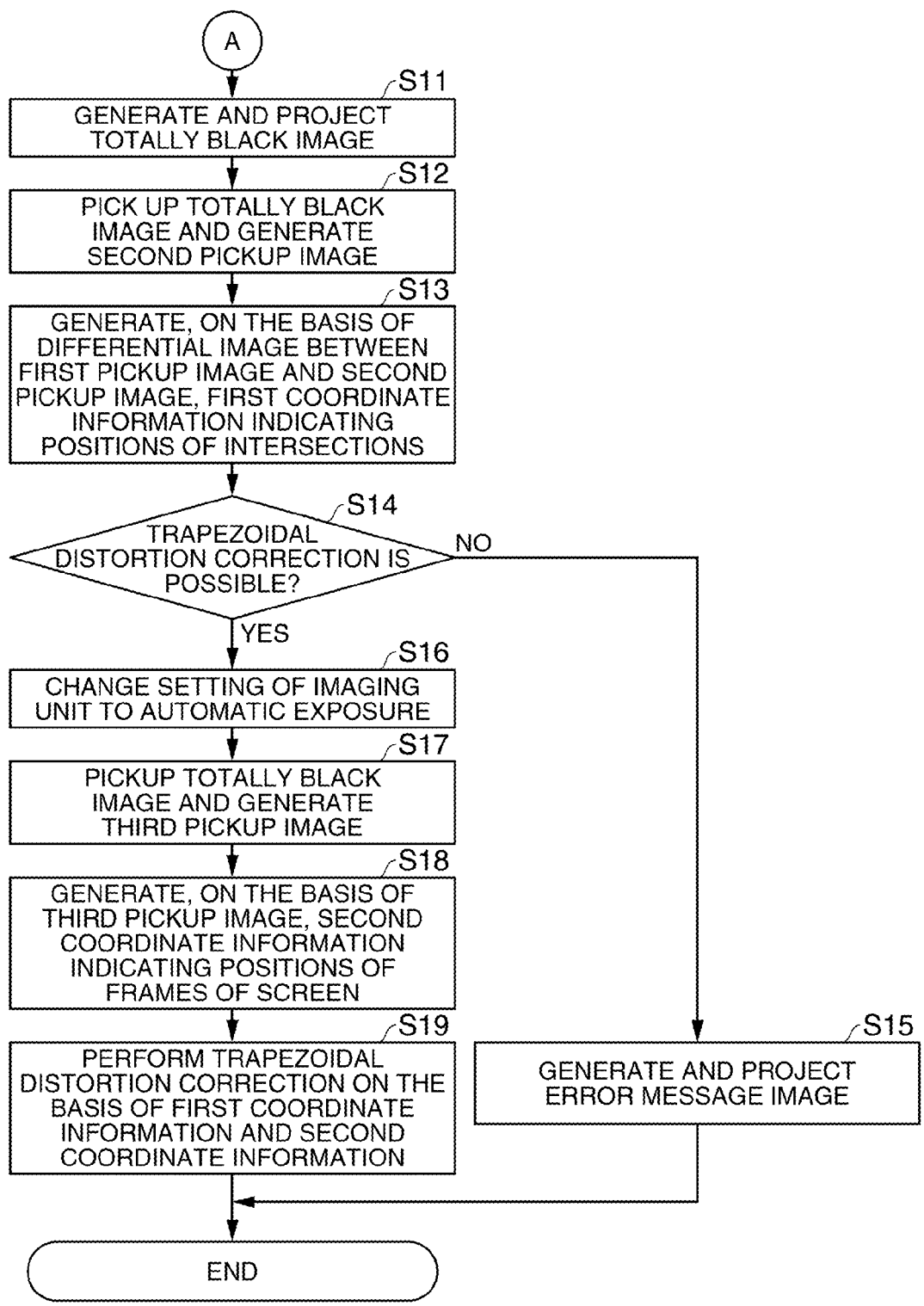
FIG. 4 is a second flowchart for explaining the exposure adjustment procedure in the first embodiment.

An exposure adjustment procedure performed by using these units is explained below. FIG. 3 is a first flowchart for explaining an exposure adjustment procedure in the first embodiment. FIG. 4 is a second flowchart for explaining the exposure adjustment procedure in the first embodiment.

The imaging control unit 110 determines, on the basis of operation information received from the operation unit 150, whether an instruction button for the automatic trapezoidal distortion correction is pressed. When the instruction button is pressed, the imaging control unit 110 initializes an exposure setting value of the imaging unit 130 (step S1).

When the instruction button is pressed, the image generating unit 160 generates a first image including a pattern image on the basis of image data, a computer program, an image signal received from an external apparatus, or the like and the projecting unit 190 projects the first image on the screen 10 (step S2).

Figure 5:
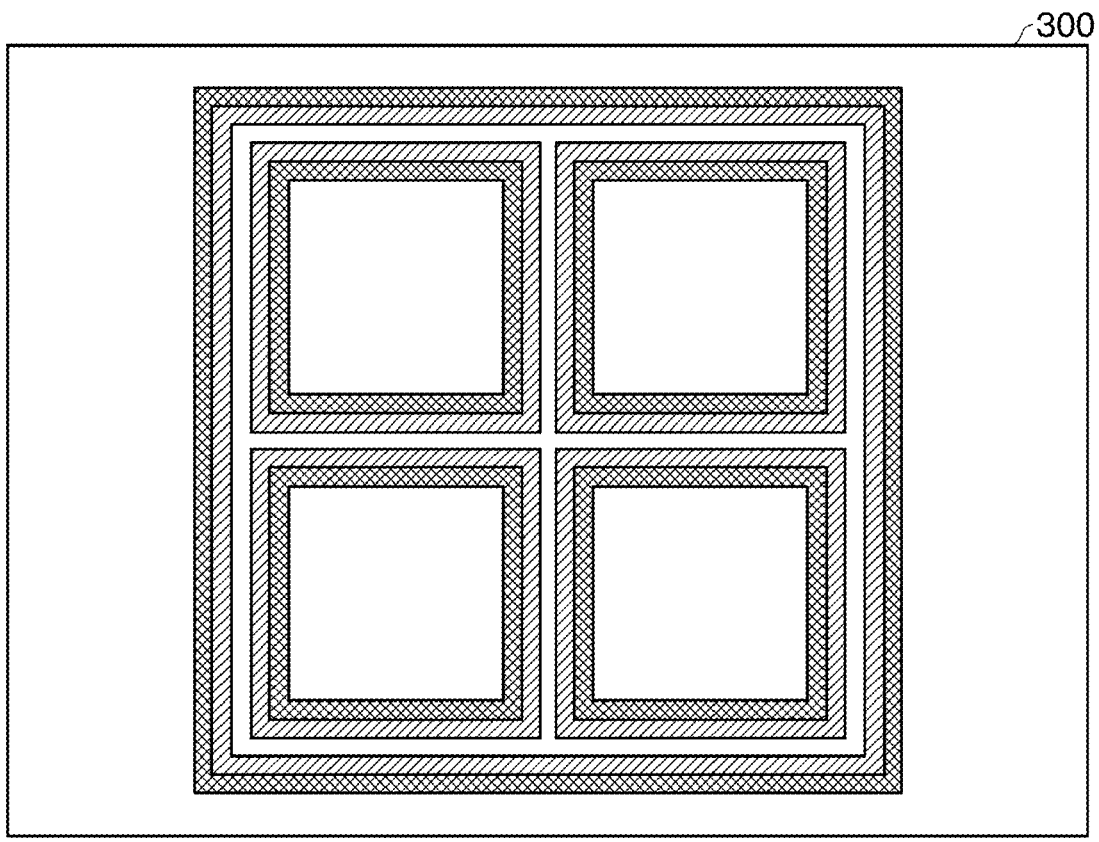
FIG. 5 is a diagram of an example of a first image including a pattern image in the first embodiment.

FIG. 5 is a diagram of an example of a first image 300 including a pattern image in the first embodiment. In the first image 300, straight lines included in the pattern image have gradations to be brightest in the center and darkest at the outer edge of the lines. For example, in the first image 300 shown in FIG. 5, a white area is provided in the center of the lines, a light gray area is provided to surround the white area, and a dark gray area is provided around the light gray area.

A background of the pattern image is an area (e.g., an area of white or black) having a gradation different from that of the area at the outer edge (in this embodiment, the dark gray area) of the pattern image. In FIG. 5, to clearly show the gradations, the pattern image and the width of the lines included in the pattern image are drawn large. However, the pattern image may be smaller than that shown in FIG. 5.

The pattern image of the first image 300 is formed in a state in which four rectangles are arranged to be connected in two rows and two columns. In other words, the pattern image is formed in a state in which three straight lines arranged in parallel and at equal intervals in the vertical direction and three straight lines arranged in parallel and at equal intervals in the horizontal direction are orthogonal to each other. The pattern image has nine intersections in total.

The imaging unit 130 picks up the first image 300 projected on the screen 10 and generates a first pickup image (step S3). The imaging unit 130 stores the first pickup image in the storing unit 120 as a part of the imaging data 122.

The imaging control unit 110 determines, on the basis of the imaging data 122, a luminance value of the intersection in the center among the nine intersections (reference points) of the pattern image included in the first pickup image (step S4). The imaging control unit 110 determines whether the luminance value exceeds an upper limit (step S5). When the luminance value exceeds the upper limit, the imaging control unit 110 determines whether the luminance value exceeds the upper limit three times or less (step S6).

When the luminance value exceeds the upper limit and exceeds the upper limit three times or less, the imaging control unit 110 changes an exposure setting value of the imaging unit 130 to a half of the present value (step S7). The imaging unit 130 picks up the first image 300 again at the changed exposure setting value and regenerates the first pickup image (step S3).

On the other hand, when the luminance value does not exceed the upper limit, the imaging control unit 110 determines whether the luminance value is smaller than a lower limit (step S8). When the luminance value is smaller than the lower limit, the imaging control unit 110 determines whether the luminance value is smaller than the lower limit three times or less (step S9).

When the luminance value is smaller than the lower limit and is smaller than the lower limit three times or less, the imaging control unit 110 changes the exposure setting value of the imaging unit 130 to a double of the present value (step S10). The imaging unit 130 picks up the first image 300 again at the changed exposure setting value and regenerates the first pickup image (step S3).

When the luminance value is equal to or smaller than the upper limit and equal to or larger than the lower limit, the projector 100 executes the following processing shown in FIG. 4 when the number of times the luminance value is determined as exceeding the upper limit is equal to or larger than four or the number of times the luminance value is determined as smaller than the lower limit is equal to or larger than four.

In the following processing shown in FIG. 4, the image generating unit 160 generates a totally black image and the projecting unit 190 projects the totally black image on the screen 10 (step S11). The imaging unit 130 picks up the totally black image projected on the screen 10 and generates a second pickup image (step S12). The imaging unit 130 stores the second pickup image in the storing unit 120 as a part of the imaging data 122.

The first coordinate information generating unit 140 generates a differential image between the first pickup image and the second pickup image on the basis of the imaging data 122 and generates first coordinate information indicating the positions of the nine intersections on the basis of the differential image (step S13). The first coordinate information generating unit 140 stores the first coordinate information in the storing unit 120 as a part of the coordinate data 124.

The positions of the intersections may be, for example, two-dimensional coordinate positions in an imaging area of the imaging unit 130 or three-dimensional coordinates in a projection coordinate system having a principal point of a projection lens of the projecting unit 190 as the origin. The three-dimensional coordinates are calculated by an arithmetic operation employing an active stereo method that makes use of a parallax between the projection lens of the projecting unit 190 and an imaging lens of the imaging unit 130.

The determining unit 170 determines, on the basis of the first coordinate information, whether the trapezoidal distortion correction is possible (step S14). For example, when all the positions of the nine intersections in the pickup image, the positions of three continuous intersections, and the like are clear or when an angle of a segment included in the pattern image in the pickup image can be determined, the determining unit 170 determines that the trapezoidal distortion correction is possible.

When the trapezoidal distortion correction is impossible, the image generating unit 160 generates an error message image and the projecting unit 190 projects the error message image on the screen 10 (step S15). The error message image is an image showing a character string such as "Measurement is impossible. Please check a setting state of the projector."

On the other hand, when the trapezoidal distortion correction is possible, the imaging control unit 110 changes the setting of the imaging unit 130 to pick up an image with the automatic exposure (step S16). The imaging unit 130 picks up the totally black image projected on the screen 10 with the automatic exposure and generates a third pickup image (step S17). The imaging unit 130 stores the third pickup image in the storing unit 120 as a part of the imaging data 122.

The second coordinate information generating unit 142 generates, on the basis of the third pickup image included in the imaging data 122, second coordinate information indicating the positions of frames of the screen 10 (step S18). The second coordinate information generating unit 142 stores the second coordinate information in the storing unit 120 as a part of the coordinate data 124.

The positions of the frames of the screen 10 may be, for example, two-dimensional coordinate positions of the four corners of the screen 10 in the imaging area of the imaging unit 130 or three-dimensional coordinates of the four corners of the screen 10 in the projection coordinate system having the principal point of the projection lens of the projecting unit 190 as the origin. The three-dimensional coordinates are calculated by the arithmetic operation employing the active stereo method that makes use of the parallax between the projection lens of the projecting unit 190 and the imaging lens of the imaging unit 130.

The trapezoidal distortion correction unit 162 performs the trapezoidal distortion correction on the basis of the first coordinate information and the second coordinate information included in the coordinate data 124 (step S19). Specifically, for example, the trapezoidal distortion correction unit 162 generates, using at least three three-dimensional coordinates among three-dimensional coordinates of the nine intersections based on the first coordinate information, projection angle information indicating relative tilts (projection angles) in the vertical direction and the horizontal direction of projection light and the screen 10.

The trapezoidal distortion correction unit 162 grasps a distortion state of an image on the basis of the projection angle information, grasps the position of the screen 10 on the basis of the second coordinate information, and sets, according to the distortion state and the position of the screen 10, a correction target area that is a desirable image forming area after distortion correction on the liquid crystal panel. The image generating unit 160 generates an image in the image forming area, whereby the projecting unit 190 can project the image with distortion corrected.

As explained above, according to this embodiment, the projector 100 can generate more accurate coordinate information by picking up, in detecting a coordinate of a segment in an image, the image with exposure based on a luminance value and an exposure setting value during the last imaging and picking up, in detecting a coordinate of a boundary line of a projection target area, the image with automatic exposure.

According to this embodiment, even when noise such as external light is included in a pickup image, the projector 100 can suppress the influence of the noise and determine, for example, coordinates of reference points by using a differential image.

According to this embodiment, since the projector 100 can more accurately generate the first coordinate information, the projector 100 can more appropriately determine whether the trapezoidal distortion correction is possible. According to this embodiment, since the projector 100 can more accurately generate the first and second coordinate information, the projector 100 can more accurately perform the trapezoidal distortion correction.

According to this embodiment, the projector 100 can accurately determine the positions of the frames of the screen 10 irrespectively of a difference in brightness around the projector 100 by picking up an image with automatic exposure setting during pickup of a totally black image for determining the positions of the frames of the screen 10.

The exposure setting value of the imaging unit 130 determined by the processing in steps S1 to S10 may be low compared with the exposure setting value of the automatic exposure in step S16. The projector 100 can prevent occurrence of a white void and accurately determine coordinates of reference points of a pattern image by setting an exposure setting value during pickup of the pattern image to a low value. The projector 100 can increase the contrast of a pickup image and accurately determine the positions of the frames of the screen 10 by setting an exposure setting value during pickup of a totally black image for determining the positions of the frames of the screen 10 to a high value.

Other Embodiments

The invention is not limited to the embodiment explained above and various modifications of the embodiment are possible. For example, a pattern image is not limited to the shape explained above and various images showing at least one segment can be applied.

Figure 6:
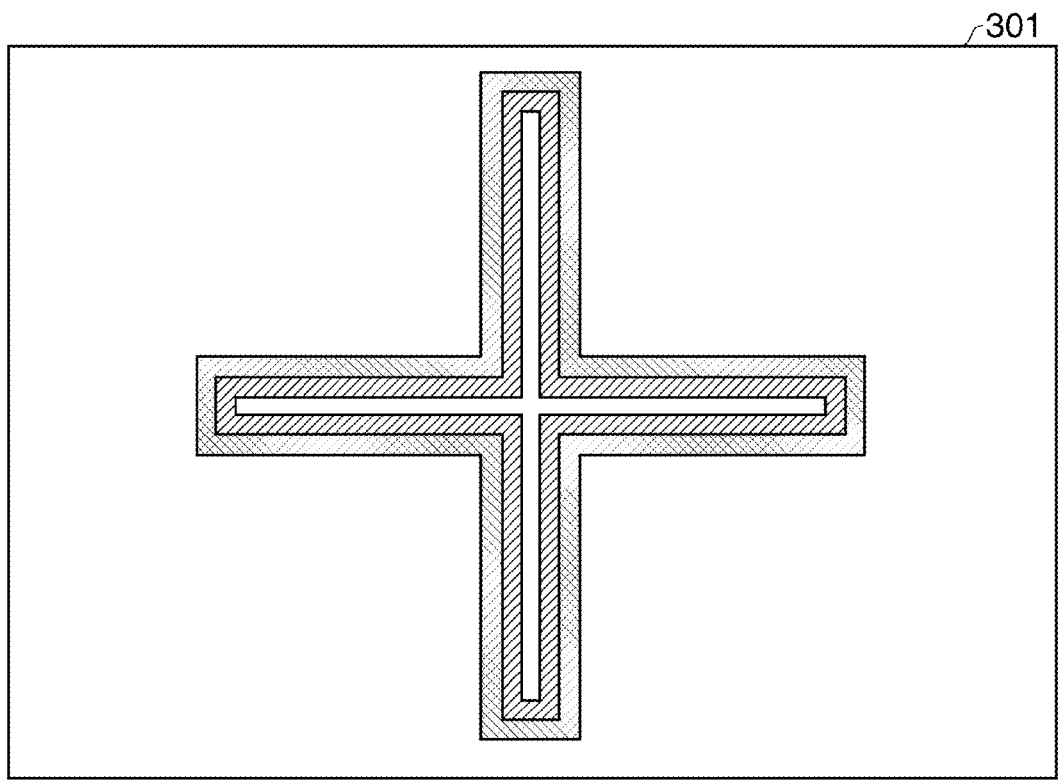
FIG. 6 is a diagram of an example of a first image including a pattern image in another embodiment.

FIG. 6 is a diagram of an example of a first image 301 including a pattern image in another embodiment. For example, the pattern image may be a pattern image of a cross as shown in FIG. 6.

The shape of the pattern image is not limited to a linear shape and may be a curve shape or may be a dot shape. Lines of the pattern image do not have to be orthogonal to one another and may be obliquely tilted. In other words, the pattern image may be a x shape rather than a + shape.

For example, the pattern image may be an image with the straight lines extending beyond the outer peripheral line of the pattern image shown in FIG. 5 (e.g., when the pattern image is a square, an image having a shape of #).

The pattern image explained above has three gradations. However, the pattern image may have four or more gradations. In the pattern image explained above, the areas of the same gradation are arranged on both the sides of the white area. However, an area of a different gradation may be arranged only on one side. For example, the pattern image may be a linear image in which the leftmost area is a dark gray area, the center area is a light gray area, and the rightmost area is a white area.

For example, an image including plural pattern images in one image may be adopted. For example, a trapezoidal distortion correction image including a + shaped pattern image for each reference point may be adopted. The number of reference points for the trapezoidal distortion correction or the like is not limited to nine and may be equal to or smaller than eight or may be equal to or larger than ten.

The segments of the pattern image have gradations in FIGS. 5 and 6 but may be segments not having gradations.

A method for the trapezoidal distortion correction is not limited to the method of the embodiment. For example, the projector 100 may pick up an image of the screen 10 in a non-projected state, set a disappearance point on the basis of the positions and the tilts of the sides of the screen 10 in a pickup image, and project and convert a two-dimensional coordinate in a camera coordinate system of the disappearance point into a three-dimensional coordinate in a projection coordinate system to thereby grasp a distortion state of an image. The projector 100 may apply a single-color (e.g., gray or red) image other than black instead of the totally black image.

The projector 100 does not have to use the differential image. For example, the imaging control unit 110 may determine a luminance value of the intersection in the center on the basis of the first pickup image. The determining unit 170 may determine, on the basis of the first pickup image, whether the trapezoidal distortion correction is possible. The projector 100 does not have to store the imaging data 122 and the coordinate data 124 in the storing unit 120.

The projector 100 may apply an average of luminance values of plural reference points instead of the luminance value of the intersection in the center. The maximum number of times of adjustment of the exposure setting value shown in FIG. 3 is not limited to three and may be equal to or smaller than two or may be equal to or larger than four.

A purpose of use of the first coordinate information is not limited to the determination concerning whether the trapezoidal distortion correction is possible or the trapezoidal distortion correction and may be, for example, auto focus adjustment. A purpose of use of the second coordinate information is not limited to the determination of the coordinate of the boundary line of the projection target area or the trapezoidal distortion correction and may be, for example, color unevenness correction.

The projection target area is not limited to the area of the screen 10 and may an area of, for example, a blackboard, a whiteboard, or a wall.

The projector 100 is not limited to a liquid crystal projector (a transmission type or a reflection type such as LCOS) and may be, for example, a projector employing DMD (Digital Micromirror Device). DMD is a trademark of Texas Instruments Incorporated in the United States. The functions of the projector 100 may be distributed to plural apparatuses (e.g., a PC and a projector).

What is claimed is:

1. A projector comprising:
    a projecting unit that projects a first image including an image showing at least one segment on a projection target area;
    an imaging unit that picks up an image of the projection target area during the projection of the first image to generate a first pickup image and picks up an image of the projection target area during single-color image projection or during non-projection with automatic exposure to generate a second pickup image;

an imaging control unit that changes, when a luminance value of a part of the segment included in the first pickup image is not within a predetermined range, an exposure setting value on the basis of the luminance value and an exposure setting value during the last imaging and causes the imaging unit to pick up an image of the projection target area during the projection of the first image at the exposure setting value after the change and regenerate the first pickup image;

a first coordinate information generating unit that generates, on the basis of the first pickup image, first coordinate information indicating a coordinate of the part of the segment; and a second coordinate information generating unit that generates, on the basis of the second pickup image, second coordinate information indicating a coordinate of a boundary line of the projection target area.

2. The projector according to claim 1, further comprising a determining unit that determines, on the basis of the first coordinate information, whether trapezoidal distortion correction is possible.

3. The projector according to claim 2, further comprising a trapezoidal distortion correction unit that performs, when the determining unit determines that the trapezoidal distortion correction is possible, the trapezoidal distortion correction on the basis of the first coordinate information and the second coordinate information.

4. A computer program product embodied in at least one computer readable medium and comprising computer instructions executable by a computer of a projector to perform the function of:

causing a projecting unit to project a first image including an image showing at least one segment on a projection target area;

causing an imaging unit to pick up an image of the projection target area during the projection of the first image to generate a first pickup image;

determining whether a luminance value of a part of the segment included in the first pickup image is within a predetermined range;

changing, when the luminance value is not within the predetermined range, an exposure setting value on the basis of the luminance value and an exposure setting value during the last imaging and causing the imaging unit to pick up an image of the projection target area during the projection of the first image at the exposure setting value after the change to regenerate the first pickup image;

generating, on the basis of the first pickup image, first coordinate information indicating a coordinate of the part of the segment;

causing the imaging unit to pick up an image of the projection target area during single-color image projection or during non-projection with automatic exposure to generate a second pickup image; and generating, on the basis of the second pickup image, second coordinate information indicating a coordinate of a boundary line of the projection target area.

5. An exposure adjusting method comprising the steps of:

causing a projecting unit to project a first image including an image showing at least one segment on a projection target area;

causing an imaging unit to pick up an image of the projection target area during the projection of the first image to generate a first pickup image;

determining whether a luminance value of a part of the segment included in the first pickup image is within a predetermined range;

changing, when the luminance value is not within the predetermined range, an exposure setting value on the basis of the luminance value and an exposure setting value during the last imaging and causing the imaging unit to pick up an image of the projection target area during the projection of the first image at the exposure setting value after the change to regenerate the first pickup image;

generating, on the basis of the first pickup image, first coordinate information indicating a coordinate of the part of the segment;

causing the imaging unit to pick up an image of the projection target area during single-color image projection or during non-projection with automatic exposure to generate a second pickup image; and generating, on the basis of the second pickup image, second coordinate information indicating a coordinate of a boundary line of the projection target area.

* * * * *